(12) United States Patent  
Lowe et al.

(10) Patent No.: US 6,300,985 B1
(45) Date of Patent: Oct. 9, 2001

(54) COMPOSITE VIDEO DECODER FOR PROVIDING A HIGH QUALITY SERIAL DIGITAL OUTPUT

(75) Inventors: Virgil L. Lowe, Roswell; John W. Curtis, Lakemont, both of GA (US)

(73) Assignee: Fortel DTV, Atlanta, GA (US)

( * ) Notice: Subject to any disclaimer, the term of this patent is extended or adjusted under 35 U.S.C. 154(b) by 0 days.

(21) Appl. No.: 09/523,889

(22) Filed: Mar. 13, 2000

Related U.S. Application Data (60) Provisional application No. 60/124,227, filed on Mar. 12, 1999.

(51) Int. Cl.[7] ........................................... H04N 9/78
(52) U.S. Cl. .......................... 348/665; 348/669; 348/670
(58) Field of Search ................................ 348/663, 667, 348/669, 665, 670; H04N 9/77, 9/78

(56) References Cited

U.S. PATENT DOCUMENTS

| | | | |
|---|---|---|---|
| 3,542,945 | 11/1970 | Parker | 178/5.4 |
| 3,860,952 | 1/1975 | Tallent et al. | 358/8 |
| 4,240,105 | 12/1980 | Faroudja | 358/31 |
| 4,297,728 | 10/1981 | Lowe | 360/36 |
| 5,204,787 | 4/1993 | Suzuki et al. | 360/36.1 |
| 5,282,038 | 1/1994 | Lowe | 358/183 |
| 5,303,061 | 4/1994 | Matsumoto et al. | 358/320 |
| 5,359,366 | 10/1994 | Ubukata et al. | 348/536 |
| 5,398,079 | 3/1995 | Liu et al. | 348/699 |
| 5,424,784 | 6/1995 | Raby | 348/668 |
| 5,424,849 | 6/1995 | Yamashita et al. | 358/337 |
| 5,452,006 | 9/1995 | Auld | 348/390 |
| 5,461,487 | 10/1995 | Asakura | 358/339 |
| 5,526,060 | 6/1996 | Raby | 348/663 |
| 5,614,952 | 3/1997 | Boyce et al. | 348/392 |
| 5,663,771 | 9/1997 | Raby | 348/663 |
| 5,686,965 | 11/1997 | Auld | 348/423 |
| 5,727,091 | 3/1998 | Kinouchi et al. | 382/246 |
| 5,742,784 | 4/1998 | Potter | 395/389 |
| 5,784,120 | 7/1998 | Cummins et al. | 348/537 |
| 5,805,238 | 9/1998 | Raby et al. | 348/609 |
| B1 3,860,952 | 1/1995 | Tallent et al. | 348/498 |

Primary Examiner—Sherrie Hsia
(74) Attorney, Agent, or Firm—Womble Carlyle Sandridge & Rice, PLLC (57) ABSTRACT

A composite video decoder that separates digitized composite video signals into luminance and chrominance, demodulates the chrominance signal to its R-Y and B-Y components, removes time base errors, synchronizes the output to the station reference signal and converts three parallel digital signals to a serial digital output signal. A three dimensional digital comb filter, an interpolation circuit for time base correction, a sync error detector circuit, a noise measurement circuit and a means of using the noise measurement level to adapt the other circuits for best operation at various noise levels of the video input signal provide high quality translation from a composite video input to a serial digital interface output (SDI). A digital line recursive filter is used to extract the horizontal synchronizing signal whether the signal is clean or masked by a very high noise level riding on the video signal.

16 Claims, 7 Drawing Sheets

COMPOSITE VIDEO DECODER FOR PROVIDING A HIGH QUALITY SERIAL DIGITAL OUTPUT

CROSS-REFERENCE TO RELATED APPLICATIONS

This application claims the benefit of U.S. Provisional Application No. 60/124,227 filed Mar. 12, 1999. This application is related to co-pending and commonly assigned patent applications "Time Base Corrector", Ser. No. 09/523, 884 and "Digital Comb Filter", Ser. No. 09/523,888, filed concurrently herewith. Each co-pending patent application is hereby incorporated by reference into this description as fully as if here represented in full.

BACKGROUND OF THE INVENTION

The present invention relates generally to an apparatus for decoding of composite video to provide high quality serial digital output and, more particularly, to a combination of unique circuits including a three-dimensional comb filter for providing better separation of composite video into luminance and chrominance components, and an optional interpolation circuit for removing any time-base errors on the composite video input.

During the transition to digital television (DTV) production and broadcasting, high quality decoding of composite video signals to produce a serial digital signal is essential to produce digital signals that are comparable to those that originate as digital signals. For signals that originate as composite video, the quality of the DTV signal at the end of the transmission system is only as good as the initial conversion to serial digital interface (SDI). Improper decoding can leave artifacts which, although normally masked in the current National Television System Committee (NTSC) and Phase Alternating Line (PAL) standards, show up as visible errors when viewed on digital television sets. Decoded composite signals may have vertical smear, color errors at vertical transitions, grainy noise, loss of horizontal resolution in both the luminance (luma) and chrominance (chroma) signals, and contouring effects. Also, once a composite signal is decoded incorrectly it may be impossible to fix the problems that are created.

SUMMARY OF THE INVENTION

This invention is a composite video decoder that produces a higher quality digitization, separation of the digitized composite video signal into luminance and chrominance, demodulation of the chrominance signal to its R-Y and B-Y components, removal of time base errors, synchronization of the output to the station reference signal and conversion of the three parallel digital signals to a serial digital signal conforming to International Radio Consultative Committee (CCIR) 259 specifications. A number of unique circuits are made to work together to achieve this improvement in video performance. The innovations consists of the following unique circuits: a three dimensional digital comb filter, an interpolation circuit for time base correction, a sync error detector circuit, a noise measurement circuit and a means of using the noise measurement level to adapt the other circuits for best operation at various noise levels of the video input signal. A unique digital line recursive filter is also used to extract the horizontal synchronizing signal whether the signal is clean or masked by a very high noise level riding on the video signal, which occasionally occurs on poor satellite or microwave links.

The unique circuit designs in the composite video decoder are designed to work together to provide a very high quality translation from a composite video input to a serial digital interface output (SDI). However, many of these circuits may be used in combination with other prior art to improve the operation of other products. Therefore, each unique circuit is described separately with an explanation of how it works with the other circuits.

The combination of circuits makes a much better video decoder. The three dimensional comb filter with the burst locked clock, chroma demodulator, the sync error detection, the interpolation time base error correction circuits, noise measurement circuits and noise immunity circuits work together to achieve a much better digital video output than possible with previous techniques.

BRIEF DESCRIPTION OF THE DRAWINGS

The invention is better understood by reading the following detailed description of the preferred embodiment in conjunction with the accompanying drawings wherein.

DETAILED DESCRIPTION OF THE PREFERRED EMBODIMENT

Figure 1:
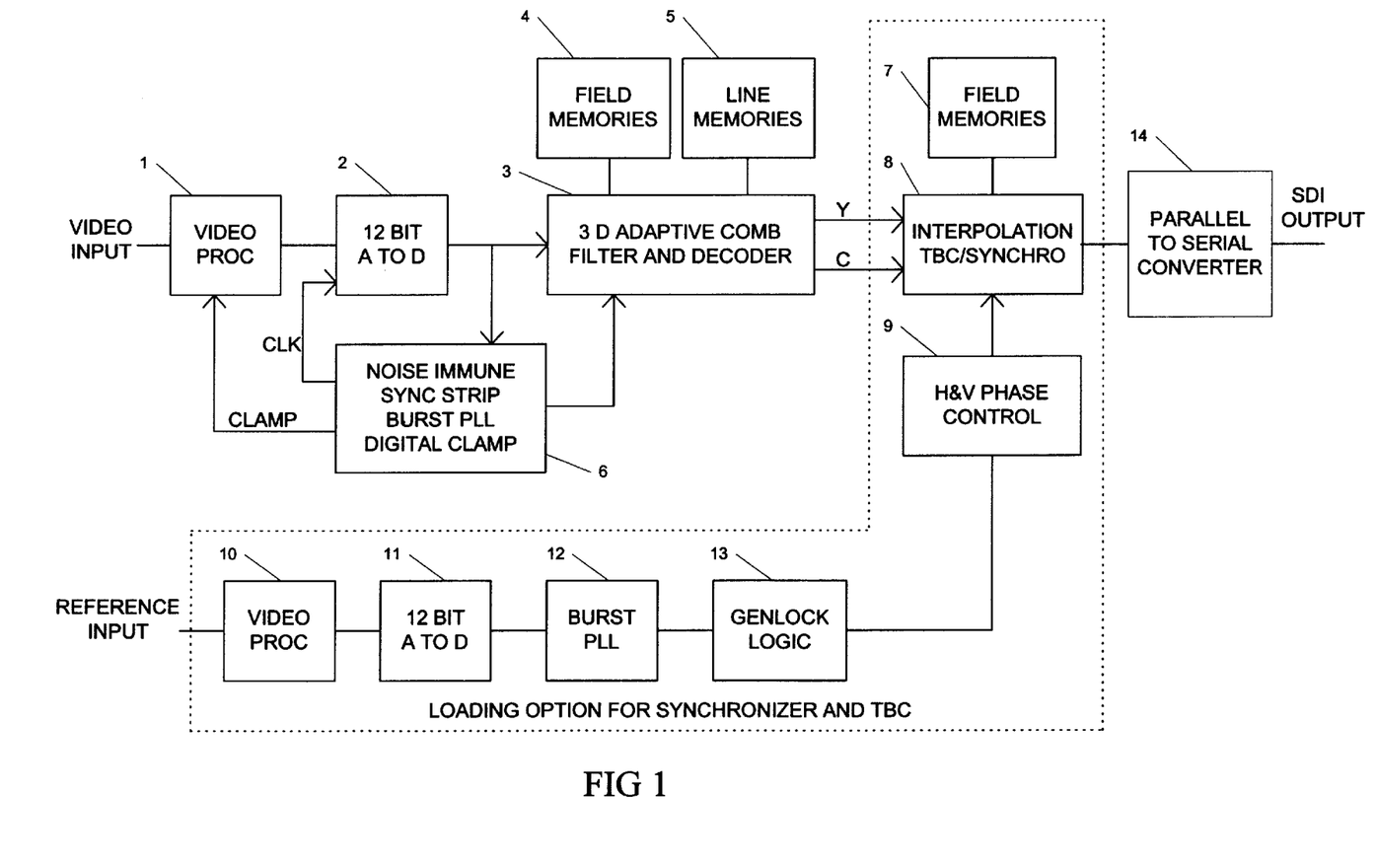
FIG. 1 is the system block diagram of the video decoder showing the interconnection of the subsystems.

Referring now to FIG. 1, block 1 is a video processing amplifier. The video processing amplifier 1 contains a video amplifier, an anti-aliasing filter, the analog portion of the clamp circuit to remove hum and direct current (DC) offsets, and the write clock oscillator. Block 2 is a 12-bit analog-to-digital converter (ADC) to convert the analog input to a 12-bit digital signal.

Block 3 is a unique three dimensional digital comb filter with a filter bank decision tree-based comb fail detection circuit and chroma demodulator. The adaptive digital comb filter 3 also contains digital processing controls to properly scale the digital luminance signal (Y) for gain and DC value and to scale the digital R-Y and B-Y signals. The output from block 3 is over-sampled Y and over-sampled R-Y and B-Y signals with the proper scaling for the CCIR-601 specification. Block 4 represents the two field memories for the field and frame delay comb filter taps. Block 5 represents the two one-line delays used in NTSC, or in PAL, to produce the three line taps for the vertical portion of the comb filter. Blocks 3,4 and 5 together are described in detail in the co-pending "Digital Comb Filter" patent application, Ser. No. 09/523,888, having the same inventors and assignee and filed concurrently herewith. This co-pending patent application in its entirety is incorporated by reference herein. FIGS. 2–6 illustrate a preferred embodiment of the digital comb filter.

Figure 6:
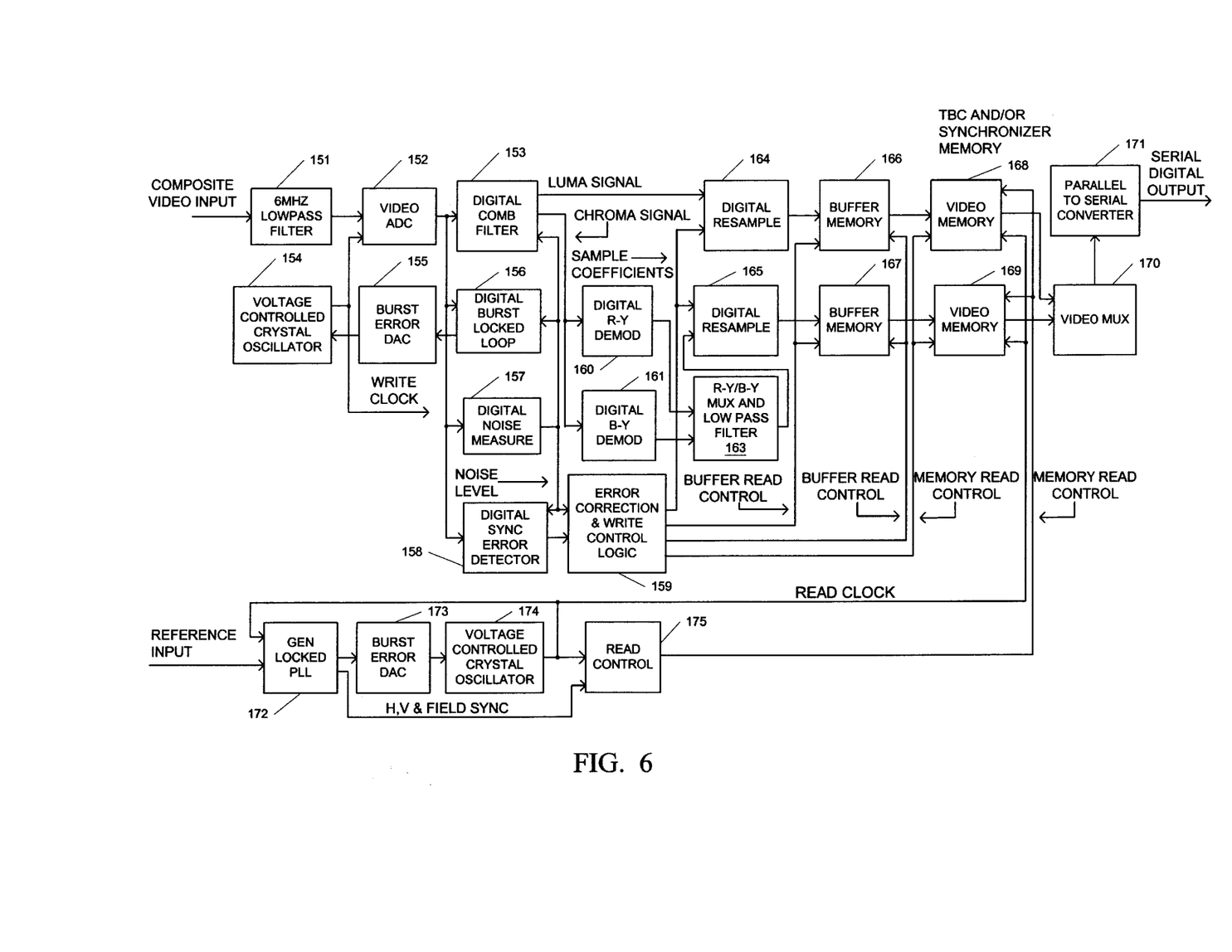
FIG. 6 is a block diagram of the video decoder with digital resampling time base corrector of the present invention.
Figure 7:
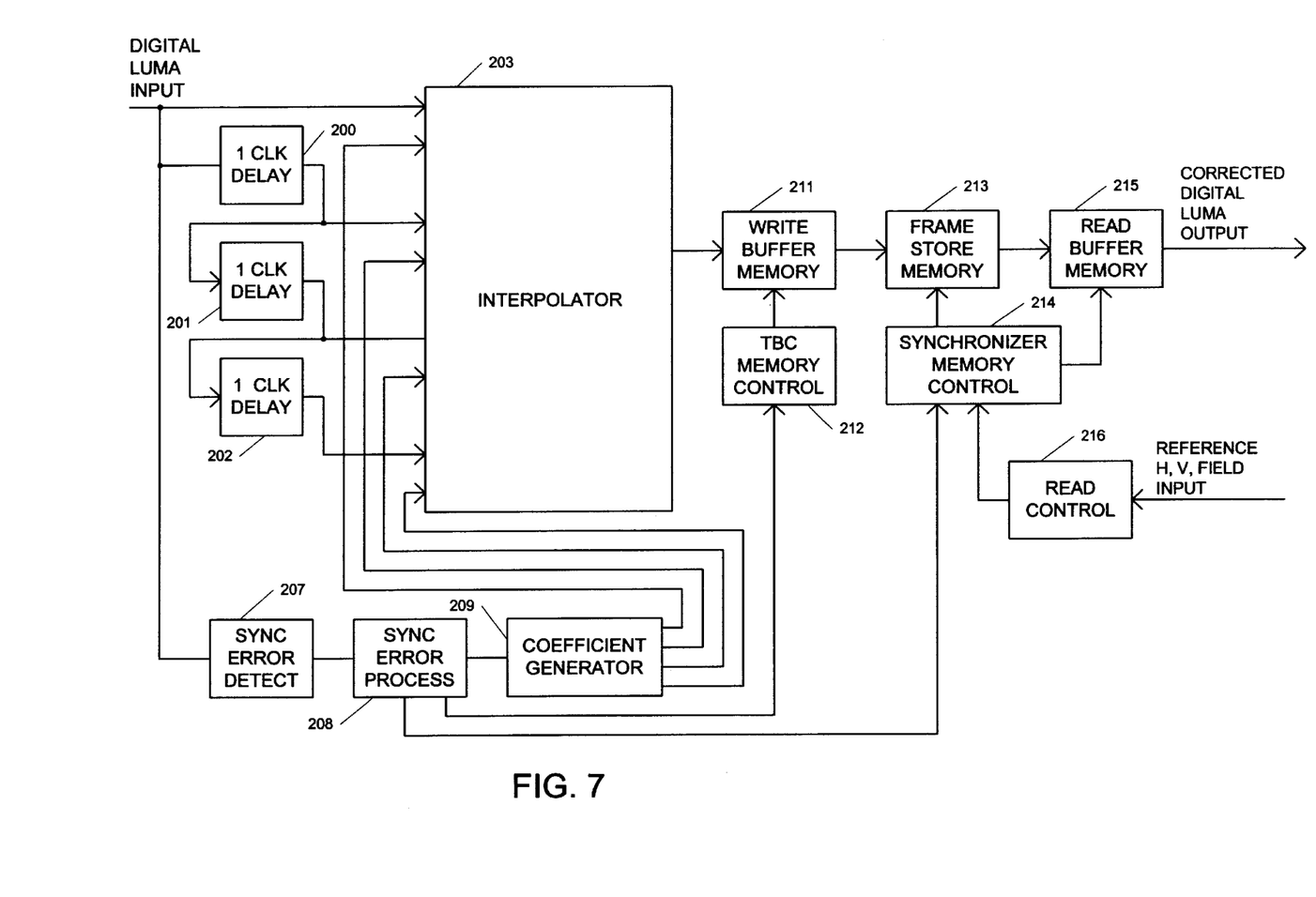
FIG. 7 illustrates the interpolation time base corrector block diagram of the present invention.

Block 6 in FIG. 1 represents the digital support circuitry that includes the noise level measurement circuit, an optional recursive sync filter for noise immunity, a sync stripper that determines the exact sync timing and the digital portion of the clamp feedback and burst phase locked loop (PLL) circuit that drives the write clock oscillator. The circuits represented by blocks 1 through 6 together with parallel to serial converter block 14 comprise the video decoder system of the present invention. The circuits represented by blocks 7 through 13 are related to the Time Base Correction (TBC) section. These circuits enhance the video decoder and, when added, give the added capability of time base correction and synchronization of unstable and non-synchronous inputs. These circuits are more fully described in co-pending, commonly assigned patent application entitled "Time Base Corrector", Ser. No. 09/523,884, the disclosure of which is incorporated by reference in its entirety herein. FIGS. 6–7 illustrate a preferred embodiment of the time base corrector.

Block 7 contains the two field memories for the synchronizer option. Block 8 contains the interpolation circuits and memory buffers for time base correction, the error detection and correction coefficient generation and synchronization memory write control logic. Block 9 contains part of the memory read control circuits that generate horizontal and vertical memory read timing. Operator-controlled settings determine the output timing of the memories. Video processing block 10 is similar to video processing block 1. It contains a video processing amplifier, a clamp circuit and an anti-aliasing filter. Block 11 is the genlock (reference) ADC circuit. Block 12 is a burst phase locked PLL for locking the reference clock to the color burst of the reference input. Block 13 is the genlock logic that contains horizontal pixel counters and pixel decoders and vertical line counters and line decoders.

Block 14 is the parallel to serial digital converter that drives the output. Digital codes are added here for start of active video (SAV) and end of active video (EAV). Error detection and handling (EDH) codes can also be added here.

Figure 2:
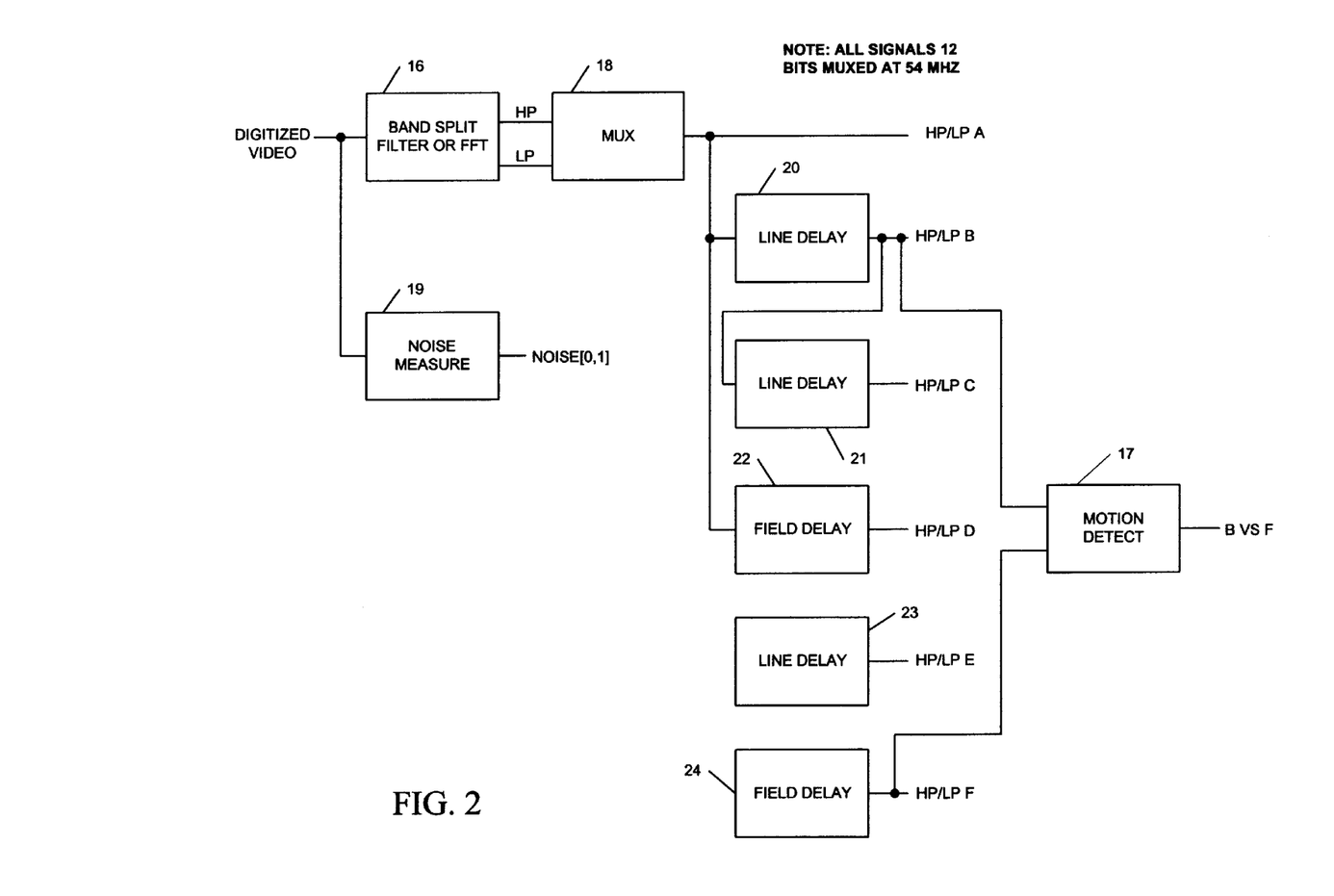
FIG. 2 illustrates the analysis of the incoming video signal by band split filtering, or alternately by use of the FFT transform.

FIG. 2 illustrates the development of the bandsplit filter bank or FFT transforms 16 that are used to define the characteristics of every part of every video line, and the delay devices that are used to produce the multiple line and field taps used by the comb filter. This processing is used to characterize every part of every video line. Delay devices are used to produce the multiple line and field taps used by the comb filter. An interframe motion detector 17 is also shown.

In FIG. 2, block 16 represents the bandsplit filter bank or the partial Fast Fourier Transform (FFT). Because the FFT would be used to correlate similar lines of video, and not to reconstruct the original signal, all of the taps of the FFT are not required. A fifteen point transform turns out to be a good compromise between having too few taps and covering too high a percentage of the line of video. A fifteen point FFT is calculated from the formula:

$$X_k = \sum_{n=0}^{15-1} x_n \cdot \left(e^{-1j\frac{2\pi}{15}}\right)^{n \cdot k}$$

In this formula $X_k$ is the value of the $k^{th}$ point of the FFT and $x_n$ is the $n^{th}$ point of a group of 15 samples on which the transform is being calculated. Later in the system, the FFT values from various lines will be compared. The presumption is that pixels that have similar FFT values can be combed.

The calculation is limited to only two points of the FFT—one near the subcarrier frequency and the other between the subcarrier and direct current (DC). Further, only the real portion of the FFT value is calculated. A test for similarity is made later, and for two complex values to match, both the real and imaginary portions must match. If the real portions do not match, then the complex numbers cannot match. If the real portions do match, while it is possible that the imaginary portions could be different, it is unlikely that this condition could persist over a significant number of clock cycles. Since the comb filter is not allowed to change states quickly, single point failures of the comparison can be tolerated and a significant savings in implementation hardware can be realized.

The preferred embodiment uses a two point band split filter bank which divides the incoming video in such a way that the low pass path (marked LP in the figures) has an upper cutoff frequency that is far enough below the subcarrier frequency and its sidebands that there is no chroma in the LP path. The high pass path (marked HP in the figures) contains both chroma and high frequency luma. This separation is used so that only the HP path needs to be combed.

Block 19 represents a noise measurement circuit which is more fully described herein. This measurement is used to allow the comb filter to adapt to noisy conditions of the input signal.

Block 18 represents a multiplexer (mux) which is used to combine the high pass and low pass bands into a single data stream, or to combine the two tap numbers from the FFT calculation with the original video data. In the preferred embodiment, the resulting data stream has data at 54 MHz, with samples being alternately from the HP and LP taps of the bandsplit filter, and both still at the 27 MHz sampling rate.

Blocks 20 and 21 are line delays that delay the current video signal to form two additional lines of video for the A, B and C lines shown in FIG. 6. Blocks 22 and 24 are field delay memories to provide field delay and frame delay taps to the comb filter. Block 23 is a line delay, which with the field delay provides the interlaced line above and below the current line (lines D and E) for the comb filter. Block 17 represents an interframe motion detector. It is used to give priority to the frame comb signal in those cases where no motion is detected between lines B and F.

Figure 3:
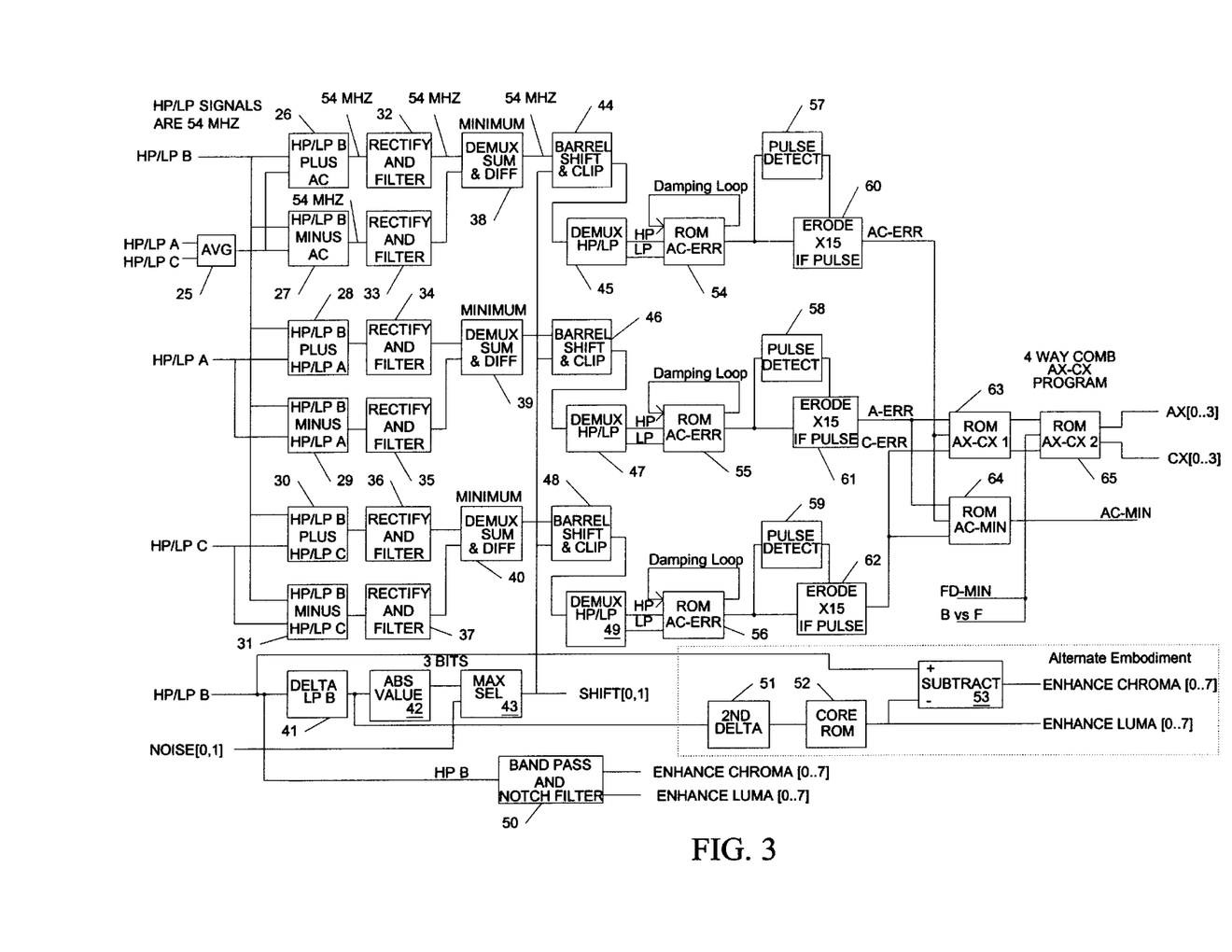
FIG. 3 illustrates the characterization(i.e., high pass (HP)/ low pass (LP)) processing for lines A, B, and C of the comb.
Figure 4:
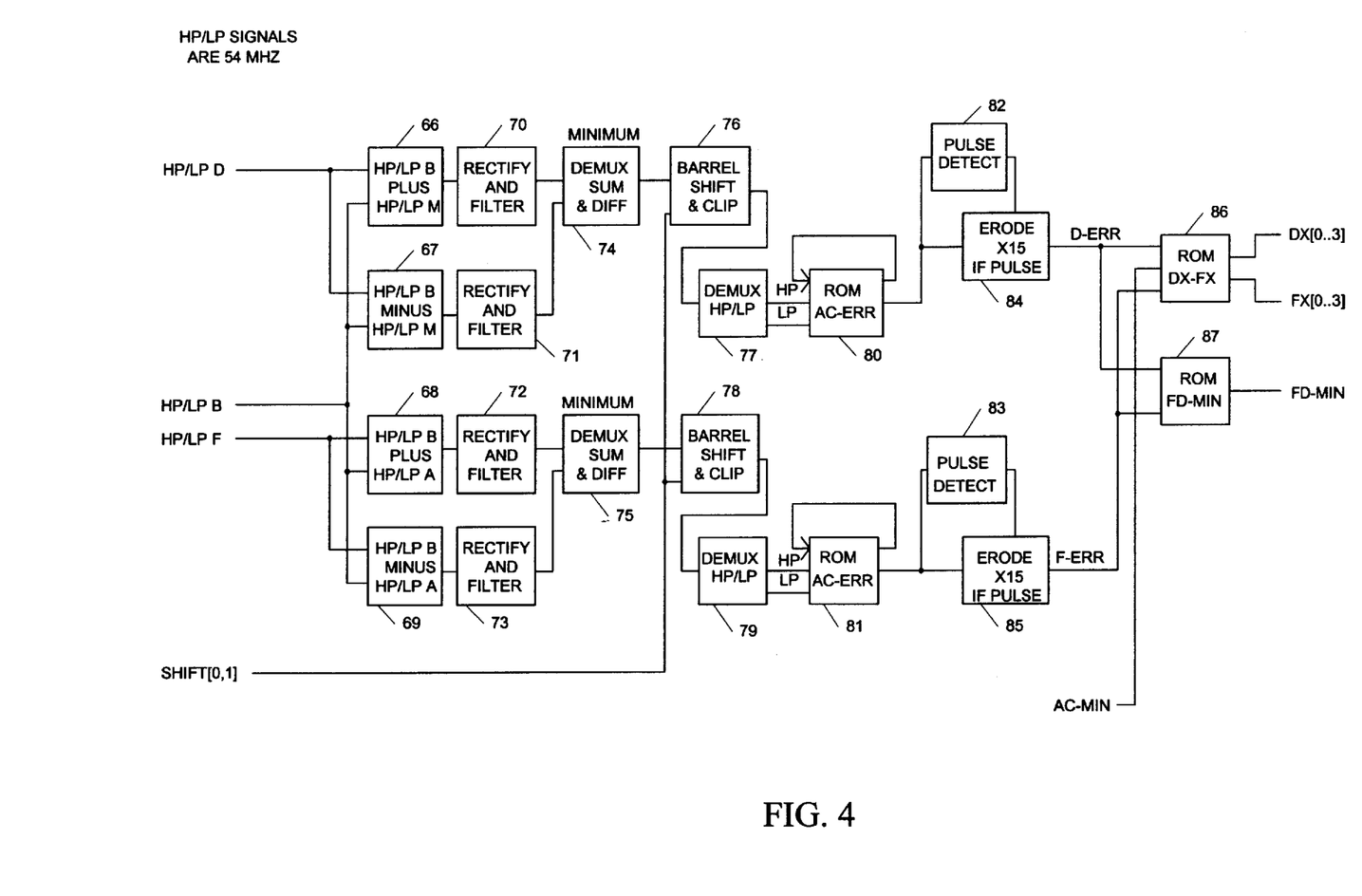
FIG. 4 illustrates the determination of the coefficients of the field and frame delay taps for lines D and F of the comb.

The output signals from FIG. 2 feed the inputs of FIGS. 3 and 4. FIG. 3 is the line comparison processing for lines A, B and C. Comparison of the various band split taps (or FFT taps) is used to determine the similarity or differences between certain video lines. HP/LP A represents the advanced line, HP/LP B represents the current line and HP/LP C represents the delayed line. The purpose of the blocks in this block diagram is to develop the multiplier coefficients for the A and C lines for use in the adders of the comb filter. Block 25 averages the band split taps from the A and C lines. In other words, the average of LP A and LP C is compared to LP B to determine the level of similarity or difference to the current line. Blocks 26 through 37 perform sum and difference comparisons between the present line (line B) and the surrounding lines, and then rectify and filter the result to obtain error magnitude signals. Once these signals are generated, the error signal generated by sum comparisons is compared to the error signal generated by difference comparisons and the smaller of the two is allowed to propagate through the rest of the comb fail circuit.

In the preferred embodiment the output of the subtraction blocks is an eight bit number. The error ROM tables do not need eight bits of resolution to control a four bit multiplier coefficient in the comb multipliers. The barrel shift blocks (44–49) use the noise level inputs from FIG. 2 in conjunction with detection of edges in the low pass tap of the line B signal to determine the sensitivity of the three bit control signal sent to the AC-ERR (block 54), A-ERR (block 55) and C-ERR (block 56) ROM blocks. In the preferred embodiment the lower significant bit (LSB) input to the barrel shifters is ignored and the next three LSBs become the output when the noise level is 00. The barrel shift blocks also contain a clip function so that three bits can represent any error above their range by clipping to all 1s. Note that if the LSB is 0 and the MSB is 7 and an error occurs in clipped to 111. This is true of blocks 44 through 49. When the input noise level increases, the Noise [0,1] input for FIG. 2 increases from 00 to 01 to 10 and finally to 11 with a very noisy input. This signal, in conjunction with the detection of edges on line B, is used to make the FFT difference less sensitive with noisy inputs so the comb does not fail due to noise alone. The barrel shifter selects bits 2,3 and 4 with Noise code 01; bits 3,4 and 5 with Noise code 10 and bits 4,5 and 6 with Noise code 11. The clip function is moved up as the bit selection is moved up.

The line comparison techniques described above tend to generate occasional pulses or "glitches" which are not related to the actual video content of the signals. These are eliminated in a two step process. The first step of the process makes use of the fact that real video signals do not change suddenly. Blocks 54, 55, and 56 represent damping loops which inhibit sudden changes in the video.

Block 54 represents a ROM table that is programmed to consider the two inputs derived from the FFT subtractions in determining the error (AC-ERR) output. If the inputs are 000 and 000 the output will be 000. If the inputs are 111 on either input the output will be 111 after a transition time. The transition time is determined by the magnitude of the change and the 3 bit count feedback. A count up is started when a larger error is detected and a count down is started when a smaller error is detected. The full transition to a larger error on the output may occur in the first six clocks of the count up and the transition to a lower error may occur on the lower 6 counts of the count down. This produces a transition and hold effect. Block 55 is the A-ERR ROM that performs the same function for the B-A error and Block 56 is the C-ERR ROM for the B-C error.

The second step makes use of the fact that pulses below a certain width cannot represent real video due to bandwidth limits. In this step, pulses are detected by examining the error signal at three points in time and looking for the low-high-low signature of a pulse. When a pulse is detected, it is eliminated by passing only the minimum value of error across its width. Blocks 54 through 62 represent this process.

Block 63 is a ROM that is programmed to consider the inputs from blocks 60, 61 and 62 in determining the output control signals that represent the differences between the A, B and C lines. If all 3 lines are very similar the output would be 000 for the A output and 000 for the C output. If different and the average AC-ERR is also different from B, the output would be 111 for both outputs. However if A-ERR and C-ERR are large but the average AC-ERR is small indicating the AC average is very similar to B, the output would be 000 and 000. If the A-ERR is large but the C-ERR is small the output would be 111 for A and 000 for B. Intermediate levels of difference are programmed for a sliding scale from 000 to 111 on each output independently.

Block 65 is programmed to use the A and C error signals from block 63, the B versus F input from block 17 in FIG. 2, and the FD-MIN input from FIG. 4, block 87. The AX and CX coefficient outputs are determined by all three inputs. If the FD-MIN is 000, 001 or 010 it indicates that the F and/or D line is similar to the B line and the sum of the D and F output coefficients (DX, FX) is as large as possible. Therefore, when FD-MIN is 000 through 010 the sum of AX and CX is 0100 which is 50% contribution from the AX+CX sum and from the FX+MX sum. The ratio of the AX and CX outputs is determined by the relative value of the A and C outputs from block 63. If the A signal from block 63 to block 65 is high indicating a large difference, and the B signal is low indicating a small error, the AX output would be 0000 and the B output would be 0100. However if the A signal and B signal are both high, meaning large errors on both signals, the AX coefficient would be 0000 and the CX coefficient would be 0000. This would mean the DX and FX coefficients would have to add to 1000 to comb 100%. The AC-MIN signal from block 64 carries the signal that indicates the degree of similarity of the A and/or C lines. When both the A and C errors are large the AC-MIN is large, the block 86 ROM receives that signal and compensates by increasing the DX and FX coefficients so that a sum of all four coefficients is kept at 1000 which is 100% even if all of that contribution has to come from one line. The B versus F signal simply raises the sensitivity to error for lines A and C if there is no motion detected between lines B and F.

Figure 5:
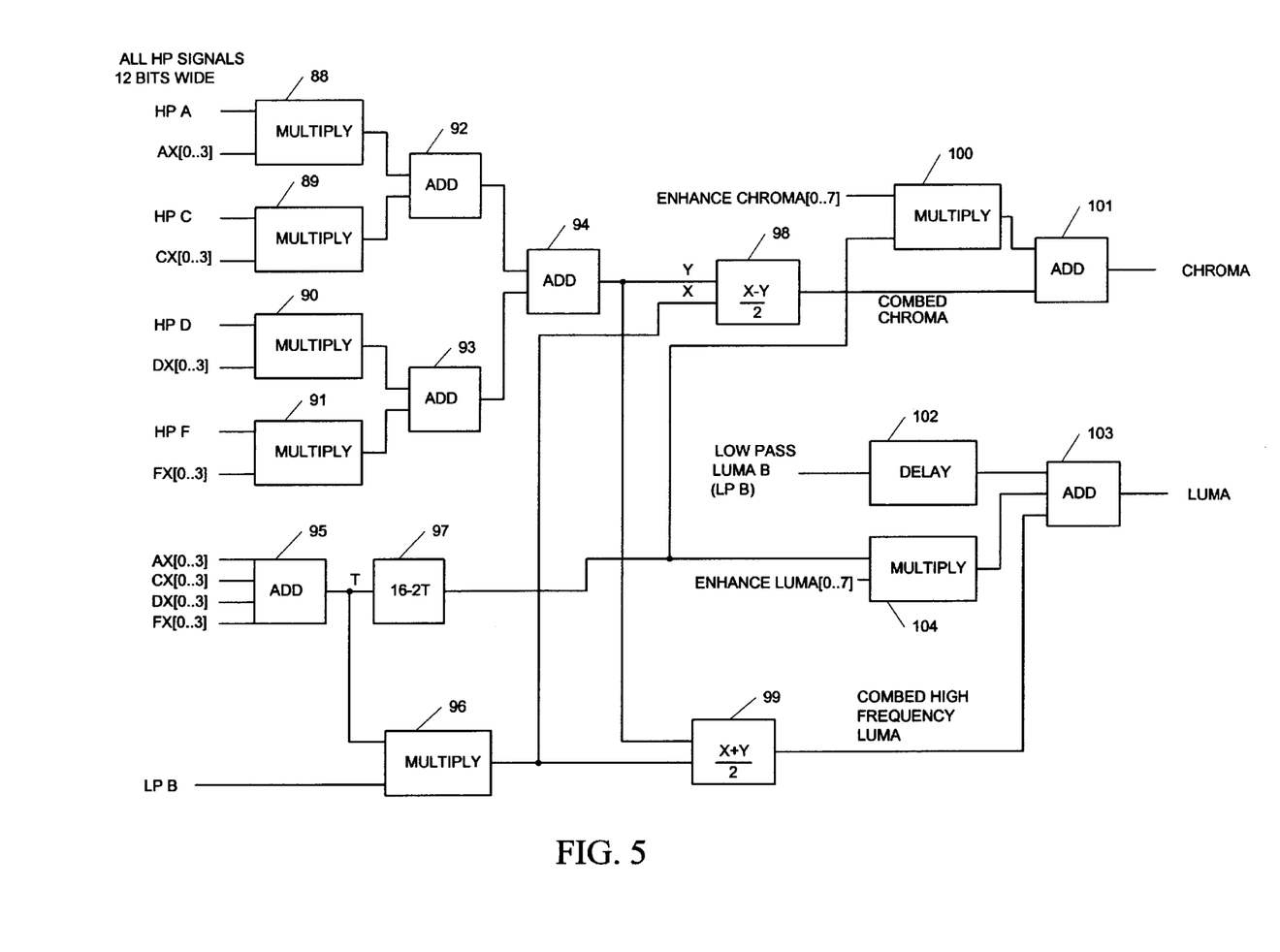
FIG. 5 illustrates the comb filter multipliers, adders, subtractors, and band pass filter that produces the chroma and luma outputs of the present invention.

Block 50 represents the band pass/notch filter mentioned above for use when there is a complete comb failure. Blocks 51, 52, and 53 represent an alternate method for enhancing the signal when there is a comb failure. In this alternative method, the second differential (i.e., discrete version of the second derivative) is calculated from the LP B signal and added back to the luma signal as shown in FIG. 5. This method produces results which are inferior to the preferred embodiment, but is available for a much lower resource cost.

FIG. 4 has been discussed already to some extent as to how it relates to FIG. 3. FIG. 4 determines the coefficients of the field and frame delay taps of the comb filter plus the value of the coefficients of the current line and in-phase line from the field delay. It is similar in function to FIG. 3 but does have several differences. Blocks 66 through 75 measure the error between lines D and B and between lines F and B as described above for blocks 26 through 40 in FIG. 3.

The barrel shift blocks 76 through 79 are the same as blocks 44 through 49. Likewise blocks 80 and 81 are ROM tables that may be programmed the same as blocks 54, 55, and 56. Blocks 82 through 85 handle pulse detection and erosion in the same way that it is handled by blocks 54 through 62.

Block 86 determines the DX and FX coefficients similar to block 65 in the previous discussion. Block 87 determines the FD-MIN signal as discussed. These blocks have the same structure as blocks 65 and 64 in FIG. 3 but may have different programs depending on the weighting desired between line combing and field and frame combing. The relative weighting between line and field/frame combing may be predetermined in engineering or selected by an operator through a remote control interface. The local microprocessor may then calculate a new set of table values and load the ROM memories.

FIG. 5 contains the comb filter multipliers, adders, subtractors, and band pass filter that produces the chroma and luma outputs. Blocks 88 through 91 are multipliers that scale the high pass taps of the four surrounding lines (A, C, D and F) to the proper adaptive values. The multiplier coefficients are AX, CX, DX and FX. They are 4 bit binary values, however, the binary value 1000 creates 100% output for any particular line so no binary value will be created that is greater than 1000. Typically the weighting will add to 100% when any line or any combination of lines is similar to the B line. When all lines are similar to the B line the four coefficients will each be 0010. The outputs of multipliers 88 and 89 are added in block 92. Likewise the outputs of blocks 90 and 91 are added in block 93. The outputs of adder blocks 92 and 93 are added in block 94. A four way adder could be substituted for these 3 blocks. The output of block 94 is the sum of all the high pass taps of the out-of-phase surrounding lines.

The high pass tap of the current line is scaled by multiplier block 96 based on the sum of the AX, CX, DX, and FX coefficients. This insures that the gain of the current line matches the total gain of the surrounding lines, a necessary condition for a valid comb. Normally this multiplier is scaled to 100% which is 01000.

When two similar video lines contain random noise the signals are coherent but the noise is non-coherent. When the lines are added the signal is doubled but the noise is only increased by the square root of 2. Therefore the noise is reduced by 3 dB when the signal is divided by 2 to achieve unity gain. When four lines are averaged the noise is reduced by 6 dB and so on. There is a noise reduction of less than 6 dB when the 4 line average of the surrounding lines is subtracted from the current line B. However, if the B line were averaged with the in-phase line E the total noise reduction would exceed 6 dB for both the chroma and luma output signals. The noise is also reduced in the high frequency band in the luma output since the high pass data is noise reduced by combing before it is added to the current line. A wideband noise reduction can be achieved on the luminance output by adding the average of the out-of-phase lines from block 94 with the average of the B line and E line at the expense of some vertical smear and motion artifacts. A signal with high noise levels often looks better with reduced noise even though some of these artifacts are present.

In normal operation, the chroma signal is created at block 98 by subtracting the out-of-phase surrounding lines from the high pass tap of line B. The subtraction will cause the in-phase luma data to cancel and leave only the chroma data Likewise, the high pass luma is created at block 99 by summing these same signals. A full bandwidth luma signal is then derived by summing the output of block 99 with a suitably delayed low pass luma tap from block 102, giving the result at block 103.

When there is a large difference on all four out-of-phase lines (A, C, D and F) the sum of the coefficients AX, CX, DX and FX will be 00000. This means the output of the adder block 94 will be 00000 and there is a total comb failure. Adaptive comb filters traditionally switch to a band split filter to separate luma and chroma signals when this happens. In this invention the effect of a band split filter is accomplished by progressively substituting the enhancement signals from FIG. 3 for combed signals coming from blocks 98 and 99. The details of this operation can be understood by noting that as the output of block 95 decreases from binary 1000 to binary 0000, the output of block 97 increases from 00000 to 10000 so that once the comb has completely failed, the entire chroma signal and the high pass luma signal are delivered through the enhancement channel instead of from the combing blocks 98 and 99.

The chroma output from block 90 is demodulated to its U and V component parts and scaled to meet CCIR-601 specifications in a somewhat conventional pair of quadrature demodulators.

In reference to FIG. 6, the input video processing circuit 151 contains an analog video amplifier, a clamp circuit for establishing the DC level required by the video ADC 152, and a low pass filter to remove high frequency components above the Nyquist frequency that may cause aliasing in the digitized video data. Block 152 is the video ADC (analog-to-digital converter). Video ADC 152 and all circuits in the preferred embodiment of the invention are clocked with a 27 MHz write clock except for the circuits writing and reading the frame store memories 168 and 169 and the following output circuits 170 and 171. The 27 MHz write clock is twice the CCIR-601 luminance rate for convenience in making the final conversion to the desired digital output format. The digital output of video ADC 152 drives the digital comb filter 153 and the burst PLL 156 (phase-locked loop). Burst PLL 156 demodulates the chrominance signal with a multiplier using a sine coefficient, accumulates the result over the burst period and integrates the result. The output of burst error DAC 155 is an analog voltage that determines the frequency of the VCXO 154. The output of the VCXO 154 is the write clock which clocks the video ADC 152 to complete the burst phase locked loop. A burst gate from the input control logic 159 is used to gate the burst error accumulation and an input from the digital noise measure circuit 157 is used to control the burst PLL gain by reducing the amount of error from the burst period accumulation that is added to the long term burst error accumulator.

The digital sync error detector 158 detects the time the sync crosses a sync-detect threshold. Its purpose is to determine the exact start of every video line in pixel clocks and sub-clock increments. The output of digital sync error detector 158 drives block 159 which is the error correction logic and write control. Error correction and write control logic 159 generates the back porch clamp gate, the burst sample gate and all other necessary register gate enables and write control logic to control the buffer writes and reads. It also calculates the correction required to reposition each video line and stretch or compress it as required to correct for any time base errors. Error correction and write control logic 159 can also contain a TBC auto mode detector that determines if the input has time base error and can enable TBC mode control. The TBC is turned off in auto mode if the input is coherent where the sync is locked to the burst, and turned on in auto mode if the input is non-coherent where the sync and burst have a changing phase and/or frequency relationship. The auto mode can be disabled by the user operator mode controls that select TBC on, TBC off, or TBC auto. Error correction and write control logic 159 also determines the amount of time base correction needed for each line and the correction needed for each pixel.

The chrominance output from the comb filter 153 is demodulated into the R-Y component by R-Y demodulator 160 and the B-Y component by B-Y demodulator 161. R-Y demodulator 160 contain a digital multiplier and a cos θ look-up table for the coefficient. R-Y demodulator 161 contain a digital multiplier and a cos θ look-up table for the coefficient because the B-Y component is offset 90 degrees from the R-Y component. The sampling rate of the data into R-Y demodulator 160 and B-Y demodulator 161 is 27 MHz and the clock rate of the multipliers is 27 MHz. The two 27 MHz data streams out of R-Y demodulator 160 and B-Y demodulator 161 are time multiplexed into a single 10 bit data stream at 54 MHz. Block 163 is a multiplexed digital low pass filter that filters each of the multiplexed R-Y and B-Y data streams independently but uses the same multipliers and adders alternately to gain efficiency of parts use.

The output from R-Y/B-Y multiplexer and low pass filter 163 goes to digital resample block 165 that is the interpolation circuit for chrominance time base correction. Digital resample block 164 is the luminance interpolator. It receives the 27 MHz luminance data from digital comb filter 153. Chrominance data is processed with two additional interpolators, one for R-Y and one for B-Y. The interpolation blocks may consist of two, three, four or more multipliers for interpolation, or may be a multiple point filter with loadable coefficients that determine the delay of the filter. A two point interpolator is less expensive and easier to implement, however, a four point interpolator can be used to more closely fit a curve between pixels with an interpolated pixel. Four point interpolation using three multipliers is used in the preferred embodiment to give good frequency response in the interpolator while using less hardware resources than a programmable filter. The three multipliers receive consecutive data samples to the multipliers. The multipliers also receive four coefficients from the error correction logic in block 159. The new pixels are created from the four surrounding pixels according to the coefficients that are determined by the error correction logic.

FIG. 7 is a detailed block diagram of the preferred embodiment of the TBC section of the video decoder. This TBC can stand alone with a stable clocked digital input that contains time base errors. For example an analog input of RGB, YUV or Y,R-Y,B-Y can be digitized with the read clock that is free running or locked to a reference source sometime known as a genlock source. In the video decoder, the input clock and digital data may not be synchronous with the reference clock.

In FIG. 7, block 200 is a one clock delay circuit that delays the input luma or R-Y/B-Y signal by one clock period. Blocks 201 and 202 are also one clock delay circuits. Together they form a series of 4 data points of consecutive pixels to the interpolator in block 203. The interpolator is used to create a new pixel value that is equal to or somewhere between the $2^{nd}$ and $3^{rd}$ pixels coming from delay circuits 200 and 201. This interpolator uses partially weighted coefficients to create a new pixel value. It should be noted that the multipliers in interpolator block 203 must be signed multipliers because negative values may be created in some of the multipliers to create the proper interpolated value for an interpolated pixel that is on a curve instead of on a straight line.

Sync error detect block 207 is a unique sync error detector circuit based on a precisely calculated sync-to-sync line length. The sync error detector circuit 207 determines the sync threshold position to sub-pixel accuracy as defined below. Sync error process block 208 processes the sync error measurement to determine integrated line length and line to line error. Horizontal (H) and vertical (V) sync and field identification is extracted for write memory control. The interpolation coefficients are generated in coefficient generator block 209. The formula for interpolation is described below.

The interpolation coefficients are used to calculate the new pixel value in interpolator block 203. The corrected pixel data is written into the write buffer memory block 211. The input pixel data is at a 27 MHz rate in order to achieve better interpolation. The data is decimated to 13.5 MHz going into the write buffer memory 211 in order to minimize memory size and speed requirements and comply with CCIR-601 specifications. This decimation is also necessary to accommodate the need to create two pixels between a single pair of input pixels when the line is being stretched. Write buffer memory 211 write control is written at a constant 13.5 MHz rate except for the occasional double clock or skipped clock as the interpolator shifts over pixel interpolation boundaries during time base correction. It is read in bursts of 54 MHz to write to the frame store memory block 213. That is because frame store memory 213 is built using synchronous dynamic random access memories (SDRAM) in a read/write sequence with a pause between write and read for memory bus reversal and other overhead time. The frame store memory write cycle time could be constant if a different type memory was used similar to a field FIFO type memory.

Block 215 is the output buffer memory. It is a small buffer that receives data from frame store memory 213 in 54 MHz bursts and outputs the data at a steady 13.5 MHz luminance rate. The synchronization memory control block 214 controls the address and clock enable for frame store memory 213 and read buffer memory 215. Synchronizer memory control 214 receives the H, V, and field control signals from sync error process 208 for write control addressing and from read control block 216 for read control addressing.

Noise measurement is used to determine the random or impulse noise on the video input signal. The noise is measured in the sync interval because measurement in the active video time is very difficult due to the nature of the video signal having various levels and frequencies throughout a field of video. The noise is measured on the digitized video signal at sync tip time. In the preferred embodiment, the measurement is done inside the falling and rising edges so the edges do not distort the measurement. Noise measurement can also be done on the back porch of the sync signal by first filtering the burst signal with a trap filter around the subcarrier frequency.

The noise is measured by first removing the DC component from the signal. This is done by delaying the signal by 4 to 16 clock ticks and subtracting the two signals. The result shows a peak at large transitions and positive and negative transitions from any noise present. Several threshold levels are set for several comparators. The number of times the signal exceeds any given comparator threshold is counted. When the count exceeds a predetermined value a register is set that defines the noise level as being greater than that threshold. The outputs of all the comparators go to a logic circuit that codes the noise level into a binary signal. In one preferred embodiment, four noise levels are coded into a 2-bit signal defined as Noise[0,1]. More noise levels could be measured and used by more elaborate logic. The binary coded noise level signal is then used to modify the sensitivity of several circuits in both the video decoder and the TBC including the digital comb filter, sync error processing for time base correction, the feedback clamp circuit, and the burst PLL circuit.

A recursive filter is one in which the current output of the filter is based in part on a previous output of the filter. In digital signal processing, the primary difference between finite impulse response (FIR) filters and infinite impulse response (IIR) filters is that the IIR filters carry some degree of recursion while the FIR filters do not. The simplest form of the recursive filter uses a weighted average between the current input value and a corresponding previous output of the filter as the new output of the filter. This class of filters is particularly effective for situations in which some attribute of the signal is known to be stable, but signal errors and distortions cause the measurement of that attribute to be unstable.

Examples of signal attributes that are known to be stable in a quality video signal are:
1. sync to sync timing;
2. color burst frequency;
3. average blanking level;
4. average sync tip level;
5. broad pulse location within a field; and
6. field sequence.

Within the video decoder and TBC, recursive filters are used to stabilize the measurement of a number of signal attributes. These include:
1. a filter which is recursive line to line which can reveal the location of horizontal sync pulses under heavy noise;
2. a filter which is pixel recursive that can reveal the location of vertical broad pulses under heavy noise;
3. a filter which is conditionally applied to the control of the main clock frequency and phase to reduce jitter caused by errors in the measurement of the color burst;
4. a filter which is conditionally applied to the control of the TBC interpolators to stabilize the measurement of line length;
5. a filter which is conditionally applied to the control of the start-of-video position to stabilize the measurement of the sync position; and
6. a filter which is conditionally applied to the clamp control signal to stabilize the measurement of back-porch level under heavy noise.

All of these applications of the recursive filter to the stabilization of video signal attributes are unique.

Those skilled in the art will appreciate that many modifications to the preferred embodiment of the present invention are possible while still obtaining the beneficial results of the present invention. It will also be apparent that some of the desired benefits of the present invention can be obtained by selecting some of the features of the present invention without using other features. Thus, the foregoing description is provided as illustrative of the principles of the present invention and not in limitation thereof, since the scope of the present invention is defined by the claims.

Additionally corresponding structures, materials, acts, and equivalents of any means plus function elements in the claims below are intended to include any structure, material, or acts for performing the functions in combination with any other claimed elements as specifically claimed.

While the invention has been particularly shown and described with reference to a preferred embodiment, it will be understood by those skilled in the art that various changes in form and detail may be made without departing from the spirit and scope of the present invention.

What is claimed is:

1. A composite video decoder for decoding composite video to a serial digital interface output, comprising:
   a video processing amplifier for receiving an analog video input;
   an analog-to-digital converter for converting the analog video input to a composite digital signal;
   a multi-dimensional comb filter for separating the composite digital signal into luma and chroma information;
   a plurality of field memories for storing field and frame delay comb filter taps;
   a plurality of line delays for generating three line taps for the vertical portion of the comb filter; and
   a parallel to serial digital converter for driving an active video output.

2. The composite video decoder of claim 1 further comprising a time base corrector for removing time base errors from the combed luma and chroma information.

3. The composite video decoder of claim 2 wherein the time base corrector further comprises:
   a video amplifier circuit for receiving a reference input signal;
   a burst phase locked loop for locking a reference clock to a color burst of the reference input; and
   a genlock logic circuit that includes horizontal pixel counters and pixel decoders and vertical line counters and line decoders.

4. The composite video decoder of claim 1 wherein the multi-dimensional comb filter comprises:
   a band split filter circuit to generate a signature signal by which each line of video can be correlated, the signature signal having a low pass band that contains only luma, and a high pass band that contains both chroma and high frequency luma;
   a multiplexer for combining samples alternately from a high pass tap and a low pass tap into a single data stream;
   a plurality of line delays for delaying the current line of video to provide line taps for the multi-dimensional comb filter from surrounding lines of video;
   a plurality of field delay memories to provide field delay and frame delay taps to the multi-dimensional comb filter;
   a line comparison circuit for comparing the various band split taps to determine the similarity or difference between the plurality of surrounding lines of video and the current line;
   a field and frame comparison circuit for determining the coefficients of the field and frame delay taps of the multi-dimensional comb filter and the value of the coefficients of the current video line and the in-phase line from the field delay; and
   a logic circuit for scaling and summing the high pass taps of the surrounding lines of video and generating chroma and high pass luma from the high pass taps of the surrounding lines of video and the current line of video.

5. The composite video decoder of claim 1 further comprising a noise level measurement circuit coupled to the multi-dimensional comb filter to allow the comb filter to adjust to noise conditions on an input signal.

6. The composite video decoder of claim 1 further comprising a recursive sync filter to provide noise immunity.

7. The composite video decoder of claim 1 further comprising a sync stripper for determining an exact sync timing and remaining locked in the presence of time base errors by a servo to a counted line length of varying lines of video.

8. The composite video decoder of claim 1 further comprising a burst phase locked loop circuit for driving a write clock oscillator.

9. A method for decoding composite video to a serial digital interface output, comprising:
   receiving an analog video input by a video processing amplifier;
   converting the analog video input to a composite digital signal by an analog-to-digital converter;
   separating the composite digital signal into luma and chroma information by a multi-dimensional comb filter;
   storing field and frame delay comb filter taps in a plurality of field memories;

generating three line taps for the vertical portion of the comb filter by a plurality of line delays; and driving an active video output by a parallel to serial digital converter.

10. The method of decoding composite video of claim 9 further comprising removing time base errors from the combed luma and chroma information by a time base corrector.

11. The method for decoding video of claim 10 wherein the step of removing time base errors further comprises:

receiving a reference input signal by a video amplifier circuit; and locking a reference clock to a color burst of the reference input by a burst phase locked loop.

12. The method of decoding composite video of claim 9 wherein the step of separating the composite digital signal into luma and chroma information comprises:

generating a signature signal by which each line of video can be correlated, the signature signal having a low pass band that contains only luma, and a high pass band that contains both chroma and high frequency luma;

multiplexing samples alternately from a high pass tap and a low pass tap into a single data stream;

delaying the current line of video by a plurality of line delays to provide line taps for the multi-dimensional comb filter from surrounding lines of video;

providing field delay and frame delay taps to the multi-dimensional comb filter by a plurality of field delay memories;

comparing a plurality of band split taps in a line comparison circuit to determine the similarity or difference between the plurality of surrounding lines of video and the current line;

determining the coefficients of the field and frame delay taps of the multi-dimensional comb filter and the value of the coefficients of the current video line and the in-phase line from the field delay by a field and frame comparison circuit; and scaling and summing a plurality of high pass taps of the surrounding lines of video by a logic circuit and generating chroma and high pass luma from the high pass taps of the surrounding lines of video and the current line of video.

13. The method of decoding composite video of claim 9 further comprising measuring noise level to allow the multi-dimensional comb filter to adjust to noise conditions on an input signal.

14. The method of decoding composite video of claim 9 further comprising providing noise immunity by a recursive sync filter.

15. The method of decoding composite video of claim 9 further comprising determining an exact sync timing and remaining locked in the presence of time base errors by a servo to a counted line length of varying lines of video.

16. The method of decoding composite video of claim 9 further comprising driving a write clock oscillator by a burst phase locked loop circuit.

* * * * *